Feb. 20, 1934.                A. TSCHERNE                1,948,057
                            ROTARY CUTTING TOOL
                            Filed April 3, 1928

Inventor
Alois Tscherne
By B. Singer, atty

Patented Feb. 20, 1934

1,948,057

UNITED STATES PATENT OFFICE 1,948,057

ROTARY CUTTING TOOL

Alois Tscherne, Rorschach, Switzerland

Application April 3, 1928, Serial No. 267,043, and in Switzerland November 25, 1927

1 Claim.  (Cl. 29—103)

This invention relates to improvements in cylindrical rotary cutting tools or milling cutters, the object of the invention being to provide an improved rotary cutting tool of this kind especially adapted for use in the machine described and claimed in Letters Patent of Switzerland, Serial No. 52,738, granted to me November 25, 1927, which may be readily, simply, and cheaply produced and which gains the additional advantage that the cutting edges thereof may be readily and accurately ground after the tool has been hardened.

In the accompanying drawing

Figure 1:
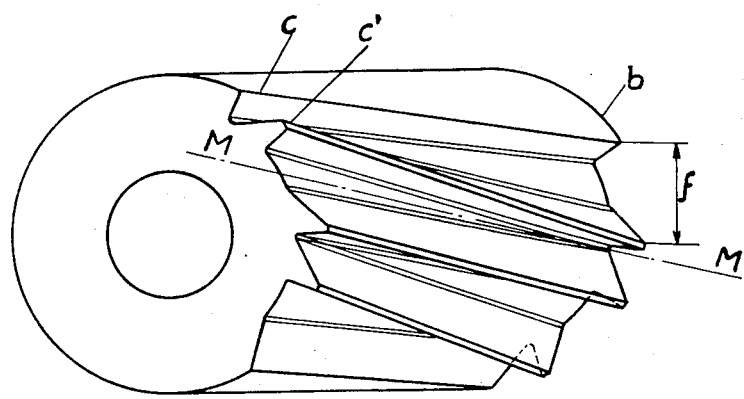
Figure 1 is a perspective of a rotary cutting tool constructed in accordance wtih this invention.
Figure 2:
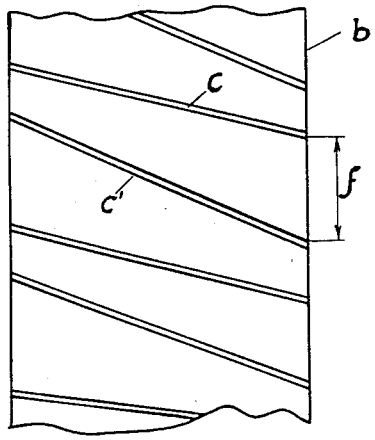
Figure 2 is an elevation of the same.

In accordance with my invention, the cylindrical tool body is provided with integral helical teeth b, the edges c, c' of which are in the same general direction from end to end of the tool in helical lines at different angles, so that each alternate tooth is at a different angle with respect to the axis of the tool or cutter than each intermediate tooth and the groove between each pair of teeth broadens progressively in one direction while each tooth is constant in cross section from end to end, and each groove between each pair of teeth is constant in depth from end to end, so that the bottoms of the grooves are concentric with the cutter. Hence the cutter can be readily, simply, and cheaply produced and an additional and important advantage is gained in that the cutting edges of the teeth may be readily, accurately ground after the tool has been hardened.

What I wish to secure by the U. S. Letters Patent is:—

A cylindrical milling cutter having integral helical teeth running in the same general direction from end to end and each alternate tooth at a different angle with respect to the axis of the cutter than each intermediate tooth, so that the groove between each pair of teeth widens progressively in one direction, each tooth being constant in cross section from end to end and each groove between each pair of teeth being constant in depth from end to end, so that the bottoms of the grooves are concentric with the cutter.

ALOIS TSCHERNE.